INVENTOR
JOHN G. SAMPLE
BY *Robert T. Dunn*
AGENT

United States Patent Office 3,250,945
Patented May 10, 1966

3,250,945
INTERDIGITAL WAVE STRUCTURE HAVING FINGERS CONNECTED TO SIDE WALLS BY INSULATION MEANS
John G. Sample, Stoneham, Mass., assignor to Raytheon Company, Lexington, Mass., a corporation of Delaware
Filed Dec. 8, 1961, Ser. No. 158,064
10 Claims. (Cl. 315—3.5)

This invention relates generally to wave propagating structures and more particularly to an improved interdigital type wave propagating structure which is more rugged and can be more readily cooled than interdigital type structures heretofore available.

The interdigital type slow wave structure is generally composed of interleaved fingers extending in opposite directions from coextensive support members and is employed in various types of traveling wave tubes for conducting radio frequency (RF) waves in energy exchanging relationship with streams of electrons. The structure as employed in traveling wave tube amplifiers and oscillators is generally disposed coextensive with an elongated interaction space through which the electrons are projected. The structure conducts the RF waves along a tortuous or serpentine-shaped path adjacent the interaction space substantially at the speed of light. However, the phase velocity of the wave fields which interact with the flowing electrons progresses at a rate substantially less than the speed of light and preferably equal to the velocity of the electrons with the result that there is an energy exchange between the wave and the electrons. The phase velocity of the wave is generally a function of the speed of light, the wave frequency and the dimensions and spacing of the interleaved fingers. For example, if the wave frequency is relatively low, the fingers may be of relatively rugged construction to obtain a suitable phase velocity, whereas if frequency is relatively high, a suitable phase velocity can only be obtained by spacing the fingers relatively close together. The transverse dimensions of closely spaced fingers must be small, and such fingers are inclined to vibration or break when the tube experiences mechanical shock. Therefore, it is one object of the present invention to provide an improved interdigital structure in which the fingers are rigidly supported to better withstand mechanical shock.

The output power of tubes employing interdigital type wave propagating structures is limited by the capacity of the tube structure to dissipate heat from the fingers. Since all output power from the tube must be conducted by at least some of the interleaved fingers, which offer a certain resistive impedance to such power flow, any efforts to increase power output by, for example, increasing the density of the electron beam often result in overheating at least a portion of the interdigital slow wave structure. Furthermore, in some tubes such as described in United States Patent 2,681,427 entitled Microwave Amplifier issued to Brown, et al. on June 15, 1954, a substantial portion of the electron beam is collected by the fingers, thereby heating the fingers. Heretofore, the fingers have been cooled by conducting heat from them to an anode member which forms a portion of the tube envelope and from there to a cooling fluid which circulates in intimate contact with the anode member. Such a structure is disclosed in copending application Serial No. 120,215 entitled "A Fluid Cooled Traveling Wave Tube" by Boyd, et al. filed June 28, 1961. It is another object of the present invention to provide means for circulating the cooling fluid in direct thermal contact with the fingers of the interdigital structure without substantially altering phase velocity of a given RF conducted by the structure.

In accordance with the present invention, the interdigital type wave propagating structure is constructed of two sets of fingers extending from substantially coextensive first and second anode members, one set of fingers being attached to and in direct electrical contact with the first anode member and the other set of fingers being attached to and in direct electrical contact with the second anode member. In addition, the first-mentioned set of fingers are connected to the second anode member by a substantially rigid body of electrical insulating material and, in a like manner, the second-mentioned set of fingers are connected to the first anode member. The electrical insulating material is preferably highly thermally conductive and may be composed of, for example, beryllia. As a result, each finger is rigidly attached to both the first and second anode members, and the structure has the mechanical appearance and rigidity of the ladder type wave propagating structure, but conducts RF waves in the manner of an interdigital type wave propagating structure.

In accordance with another feature of the invention, the first and second anode members include cavities which are connected by fluid conduits enclosed within some or all of the fingers and their associated insulators so that a cooling fluid may flow from one anode member to the other through the conduits in the fingers conducting heat therefrom and permitting high power operation.

Other features and objects of the invention will be apparent from the following specific description taken in conjunction with the figures in which.

Figure 1:
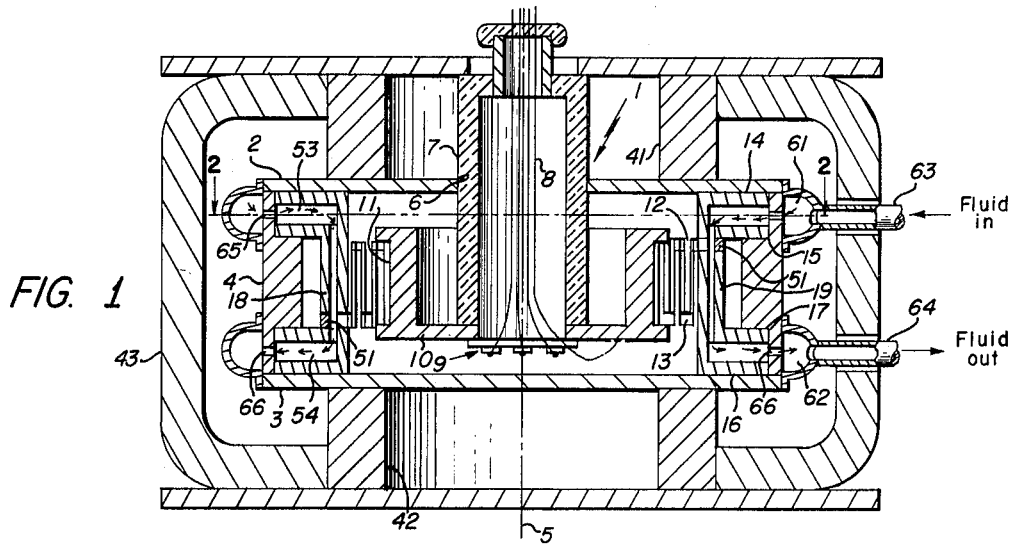
FIG. 1 illustrates a side-sectional view of one type of traveling wave tube including an interdigital type wave propagating structure constructed in accordance with the present invention.

Turning first to FIG. 1 there is shown a plan cross-section view of a crossed-field type traveling wave tube substantially the same in many respects as the tube described in the above-mentioned copending United States patent application Serial No. 120,215 but including features of the present invention. The crossed-field type traveling wave tube with a circular interaction space is described herein by way of example to show one use of the invention. Principles of the invention, however, are applicable to interdigital type wave propagating structures wherever they may be employed.

Figure 2:
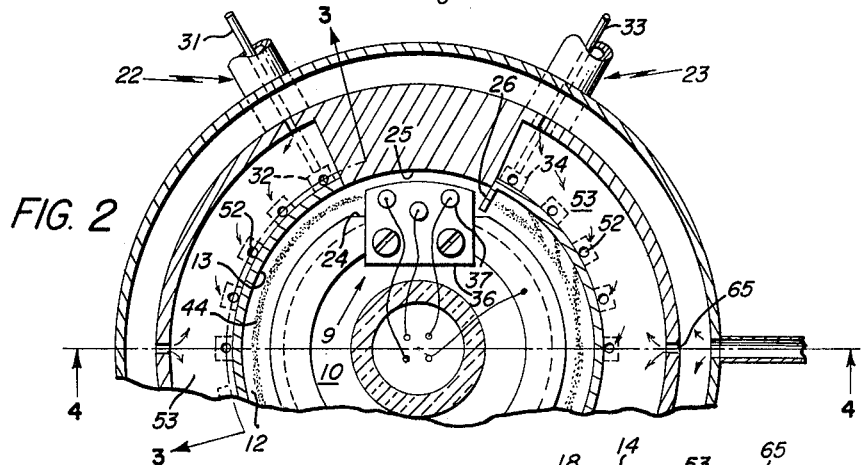
FIG. 2 illustrates a plan-sectional view of the above-mentioned traveling wave tube.

The tube illustrated in FIGS. 1 and 2 includes an evacuated envelope 1 formed by upper and lower plates 2 and 3 which are sealed at their periphery to a cylindrical anode member 4, all disposed concentric with the tube axis 5. An opening 6 is provided in upper plate 2 to accommodate the ceramic support member 7 which projects into and is sealed to the opening. Ceramic support member 7 is preferably hollow to provide a passage for electrical leads 8 supplying potentials to the electron gun structure 9 and to the sole electrode 10.

The sole electrode 10 is supported within the envelope at one end of ceramic support member 7 and provides a circular conductive surface 11 defining one boundary of the circular interaction space 12, in addition to supporting the electron gun structure 9.

Figure 3:
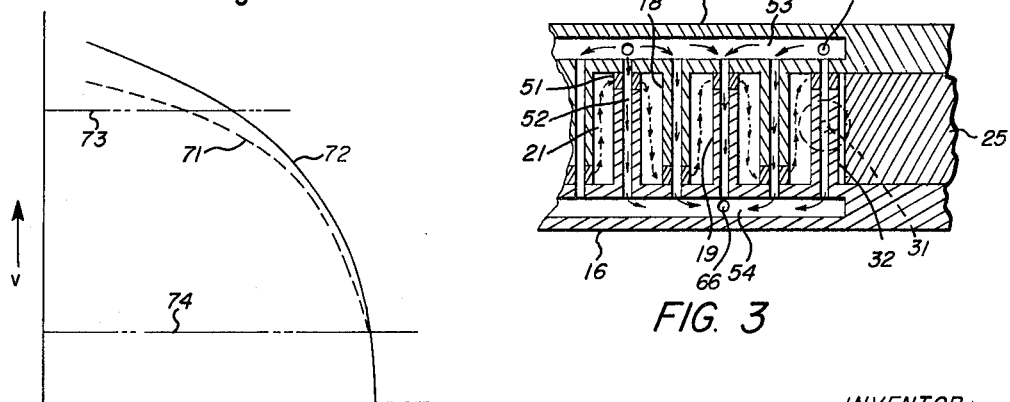
FIG. 3 illustrates a sectional view of the interdigital wave propagating structure and anode members included in the tube showing details to illustrate features of the invention.

The other boundary of the interaction space 12 is formed by the interdigital type slow wave propagating structure 13. Structure 13 is preferably formed in two parts as shown in FIG. 3. One part includes an upper ring-shaped anode plate 14 fastened securely to a groove 15 along one end of anode cylinder 4 and a lower ring-shaped anode plate 16 securely fastened to another groove 17 in the other end of anode ring 4, both plates 14 and 16 being disposed concentric with the axis 5. One set of fingers 18 extends from upper ring 14, and another set of fingers 19 extends from lower ring 16 in such a manner that the fingers are interleaved as shown in FIG. 3 forming a tortuous path for RF waves which is indicated by the broken line arrows 21 in FIG. 3.

The structure 13 in the tube illustrated is not continuous along the circular interaction space 12 but has two ends which are connected to different terminals extending beyond the envelope of the tube and represented by coaxial lines 22 and 23 which might, for example, be employed as input and output terminals. As illustrated by the plan-sectional view in FIG. 2, the slow wave structure 13 does not extend along the portion of the circular interaction space 12 which is occupied by the electron gun 9. This portion of the interaction space is bounded by the truncated part 24 of sole electrode 10 and a dummy anode section 25 extending between the upper and lower anode rings 14 and 16 in place of the fingers. In some applications an elaborate electron collecting structure is mounted to the dummy anode 25. However, for purposes of illustration herein only a simple barrier 26 (shown in FIG. 2) is mounted to the dummy anode 25 to collect any electrons which are not collected along the slow wave structure 13. One suitable method for coupling coaxial lines such as coaxial lines 22 and 23 to opposite ends of an interdigital type slow wave structure is described in considerable detail in the mentioned copending United States patent application. Accordingly, details of such coupling are not shown herein except by phantom lines in FIGS. 2 and 3. As shown by the phantom lines, the center conductor 31 of coaxial line 22 attaches to the last finger 32 at one end of the structure 13, while the center conductor 33 of coaxial line 23 couples to the last finger 34 at the other end of the structure 13, the outer conductors of both coaxial lines being attached to the outer wall of anode ring 4.

In operation potentials are applied via lines 8 to the electron emitting and control electrodes which form electron gun 9 and which are insulatedly mounted between a pair of plates such as plate 36 which is attached to sole electrode 10. The gun electrodes are preferably supported at insulated terminals such as 37 and include at least an electron emitting electrode, a heater and a control grid. One of the lines 8 provides a potential to the sole electrode 10. This potential is preferably negative with respect to the grounded envelope and anode structures. As a result, a substantially radial electric field is bounded by the sole electrode 10 and the wave propagating structure 13.

The transverse magnetic field extends through the interaction space substantially parallel to the axis 5 between upper and lower magnetic pole pieces 41 and 42. These pole pieces are generally cylindrical in shape and disposed concentric with the tube axis 5. They contact opposite poles of a permanent magnet 43 forming what may be described as a toroidal-shaped permanent magnet. In operation the above-mentioned transverse magnetic and electric fields in the interaction space 12 compel electrons 44 issuing from the electron gun 9 to travel through the interaction space as a beam at a predetermined velocity which is preferably equal to the phase velocity of the RF fields of waves propagating through the slow wave structure 13 which interact with the electrons. The wave fields and the beam electrons 44 thus interact, and there is an exchange of energy therebetween. For example, in the tubes shown in FIGS. 1 and 2 radio frequency waves launched into coaxial line 22 are conducted through structure 13 in a counterclockwise direction as viewed in FIG. 2 and are amplified by the beam of electrons so that they emerge at coaxial line 23 considerably amplified.

In accordance with one feature of the present invention, each set of interleaved fingers conductively attached to a different one of the opposing anode rings 14 and 16 are each also attached to the other anode ring by individual electrical insulators such as 51 so that the fingers no longer are supported only by attachment to one of the anode rings. The individual electrical insulators thus connect the unsupported end of each finger to the immediately adjacent anode ring to form a structure having a mechanical appearance not unlike the well-known ladder type wave propagating structure. The electrical insulators 51 are preferably highly thermally conductive and, accordingly, may be made of beryllia or any material having similar thermal and electrical characteristics and of equivalent mechanical strength which can be made to adhere to the ends of fingers made of, for example, copper. Accordingly, the set of fingers 18 extending from the upper anode ring 14 and electrically attached thereto have their ends connected to lower anode ring 16 by insulators such as 51 which are attached to the lower ring and also to the ends of such fingers. In a like manner, the fingers electrically attached to and extending from the lower ring 16 are thermally connected to the upper ring 14 by similar insulators providing a rigid interdigital type slow wave propagating structure capable of withstanding considerable vibration and mechanical shock without alteration of its electrical characteristics.

Another feature of the invention is also illustrated in the figures whereby the fingers are individually cooled by passageways conducting a cooling fluid through each of the fingers in intimate contact therewith. Accordingly, openings such as 52 may be made through the length of each finger and also through the thermally conductive electrical insulator 51 attached to the end of each finger. These openings may be drilled or formed in any other convenient manner so as to connect to fluid passages 53 and 54 in the anode rings. For example, passage 53 is provided in upper ring 14, and passage 54 is provided in lower ring 16. These passages preferably extend concentric with the wave propagating structure along the complete length of the structure or at least along a substantial portion of the length of the structure so as to conduct fluid to the opening such as 52 in the fingers which are most inclined to be heated during operation of the tube. All of the fingers in the tube illustrated are cooled in this manner; however, it is quite apparent that only those fingers which are most inclined to be heated during operation could be cooled in this manner, such as the fingers at the end of the structure which connect to the output coaxial 23 and which collect a substantial portion of the electron flow from the electron gun 9 as shown in FIG. 2.

Convenient structure for introducing the coolant fluid to and from the spaces 53 and 54 is illustrated in FIG. 1. For example, external manifolds such as 61 and 62 are provided along the outside of the tube envelope and are connected to tubes 63 and 64 which conduct fluid into and out of the device. The manifolds 61 and 62 connect to the spaces 53 and 54, respectively, by suitably placed openings in the anode ring 4. For example, manifold 61 connects to space 53 by a number of radially disposed openings 65 along the upper part of anode cylinder 4, while the lower manifold 62 connects to space 54 by a similar plurality of openings 66 along the lower part of anode cylinder 4. Thus, the flow of cooling fluid into the envelope through the fingers and out of the envelope is as indicated by the solid line arrows in the figures.

Figure 4:
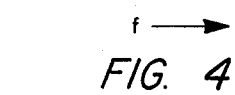
FIG. 4 includes curves to illustrate the comparable performance of an interdigital wave propagating structure including features of the invention.

As mentioned above, the insulators 51 connecting the end of each finger to the opposing anode ring do not substantially alter the electrical characteristics of the interdigital structure or the phase velocity of given RF waves propagating therethrough. To be more specific, the RF waves are conducted along the same path at substantially the same phase velocity as they would be if the insulators were not included. However, as expected, the phase velocity of waves at frequencies below the given RF are somewhat altered by the presence of the insulators. FIG. 4 illustrates a typical relationship between phase velocity $v$ and frequency $f$ for a given finger construction with and without the insulators, such as insulators 51, supporting the ends of the fingers. The broken line 71 illustrates performance without the supporting insulators, and the solid line 72 represents performance with the insulators. The dot-dash lines 73 and 74 represent practical limits of operation. The lower limit of phase velocity is established at $\pi$ mode operation when the phase difference between adjacent gaps between fingers is 180° and the upper limit is determined by the maximum electric field strength in the interaction space. These limits establish operating bandwidth of the tube which includes such a structure. One effect of the support insulators is to decrease the operating bandwidth slightly.

While the present invention relates to an improved interdigital slow wave propagating structure whereby the structure which inherently has certain mechanical weaknesses is made more rugged and, in addition, can be more effectively cooled, it is to be clearly understood that this is made only by way of example to show one useful embodiment of the invention whose spirit and scope is set forth in the accompanying claims.

What is claimed is:
1. An interdigital wave propagating structure comprising:
   interleaved conductive elements supported at one end by and extending from coextensive conductive surfaces and electrically connected thereto for forming a path for radio frequency waves;
   and insulators coupling the remaining end of each of said elements to an adjacent coextensive conductive surface.
2. An interdigital wave propagating structure comprising:
   interleaved conductive elements supported at one end by and extending from coextensive conductive surfaces and electrically connected thereto for forming a path for radio frequency waves;
   and highly thermally conductive electrical insulators coupling the remaining end of each of said elements to an adjacent coextensive conductive surface.
3. An interdigital wave propagating structure comprising:
   interleaved conductive elements supported at one end by and extending from coextensive conductive surfaces and electrically connected thereto for forming a path for radio frequency waves;
   highly thermally conductive electrical insulators coupling the remaining end of each of said elements to an adjacent coextensive conductive surface;
   openings through a plurality of said insulators, elements and surfaces for conducting a fluid;
   and means compelling said fluid to flow through said openings exchanging heat with said members.
4. An interdigital type slow wave propagating structure comprising:
   first and second coexistensive electrically conductive surfaces;
   first and second sets of elongated electrically conductive members, said first set being electrically connected to said first surface and said second set being electrically connected to said second surface;
   and a plurality of insulators each supporting the end of one of said members from the conductive surface to which it is not electrically connected.
5. An interdigital type slow wave propagating structure comprising:
   first and second coextensive electrically conductive surfaces;
   first and second sets of elongated electrically conductive members, said first set being electrically connected to said first surface and said second set being electrically connected to said second surface;
   a plurality of insulators each for insulatedly supporting the end of one of said members from the conductive surface to which it is not electrically connected;
   openings in said surfaces, said members and said insulators for conducting a fluid;
   and means compelling said fluid to flow trhough said openings exchanging heat with said members.
6. An interdigital type slow wave propagating structure comprising:
   first and second coextensive electrically conductive surfaces;
   first and second sets of elongated electrically conductive members, said first set being electrically connected to said first surface and said second set being electrically connected to said second surface;
   a plurality of highly thermally conductive electrical insulators each for insulatedly supporting the end of one of said members from the conductive surface to which it is not electrically connected;
   openings in said surfaces, said members and said insulators for conducting a fluid;
   and means compelling said fluid to flow through said openings exchanging heat with said members.
7. An interdigital type slow wave propagating structure comprising:
   first and second coextensive electrically conductive surfaces each enclosing spaces containing fluid;
   first and second sets of elongated interleaved conductive members, said first set being electrically connected at one end to said first conductive surface and said second set being electrically connected at one end to said second conductive surface;
   a plurality of electrical insulators, each connecting the other end of a different member to the surface to which it is not electrically connected;
   and openings through each of said members and insulators in registry with openings in said conductive surfaces for conducting fluid through said members in heat-exchanging relationship therewith.
8. A traveling wave tube including a slow wave propagating structure disposed coextensive with an elongated interaction space and enclosed within an evacuated envelope for conducting waves adjacent said interaction space through which electrons are compelled by an electron gun disposed adjacent said interaction space to move in energy exchanging relationship with said waves;
   said structure comprising:
   a plurality of elongated conductive elements each having one end electrically connected to said envelope;
   a plurality of electrical insulators each connecting the other end of one of said elements to said envelope so that both ends of each of said elements are rigidly supported from said envelope.
9. A traveling wave tube including a slow wave propagating structure disposed coextensive with an elongated interaction space and enclosed within an evacuated envelope for conducting waves adjacent said interaction space through which electrons are compelled by an electron gun disposed adjacent said interaction space to move in energy exchanging relationship with said waves;
   said structure comprising:
   a plurality of elongated conductive elements each having one end electrically connected to said envelope;
   and a plurality of thermally conductive insulators each connecting the other end of one of said elements to said envelope thereby providing rigid support for said members and paths for conducting heat therefrom to said envelope.

10. A traveling wave tube including a slow wave propagating structure disposed coextensive with an elongated interaction space and enclosed within an evacuated envelope for conducting waves adjacent said interaction space through which electrons are compelled by an electron gun disposed adjacent said interaction space to move in energy exchanging relationship with said waves;

said structure comprising:

a plurality of elongated interleaved conductive elements each having one end electrically connected to said envelope;

a plurality of electrical insulators each connecting the other end of one of said elements to said envelope;

fluid passages outside said envelope;

and openings in said elements, insulators and envelope connecting said passages for conducting fluid through said elements.

References Cited by the Examiner

UNITED STATES PATENTS 2,546,773  3/1951  Nelson _____ 313—32 X

FOREIGN PATENTS 992,607  1/1955  Germany.

HERMAN KARL SAALBACH, *Primary Examiner.*

GEORGE N. WESTBY, *Examiner.*